United States Patent [19]

Burgdorf et al.

[11] Patent Number: 4,655,119
[45] Date of Patent: Apr. 7, 1987

[54] LOW-PRESSURE CASING FOR A BRAKE BOOSTER

[75] Inventors: Jochen Burgdorf, Offenbach-Rumpenheim; Rolf Weiler, Frankfurt-Sindlingen, both of Fed. Rep. of Germany

[73] Assignee: ITT Industries, Inc., New York, N.Y.

[21] Appl. No.: 286,101

[22] Filed: Jul. 22, 1981

[30] Foreign Application Priority Data

Aug. 26, 1980 [DE] Fed. Rep. of Germany ....... 3032049

[51] Int. Cl.⁴ .............................................. F01B 11/02
[52] U.S. Cl. ..................................... 92/169; 92/98 D
[58] Field of Search .................... 60/547.1; 91/369 A; 92/98 R, 98 D, 99, 169, 169.2, 169.3; 220/327, 328, 4 B, 4 E

[56] References Cited

U.S. PATENT DOCUMENTS

| 2,185,216 | 1/1940 | McManus et al. | 92/169.2 |
| 4,246,755 | 1/1981 | Weiler | 92/169.2 |
| 4,377,069 | 5/1983 | Kobayashi | 60/547.1 |

FOREIGN PATENT DOCUMENTS

| 2845794 | 4/1979 | Fed. Rep. of Germany | 92/169.3 |
| 1277541 | 10/1961 | France | 92/177 |
| 2034430 | 6/1980 | United Kingdom | 92/169.2 |

OTHER PUBLICATIONS

*Automotive Engineer,* "Brake System Weight Reduction", vol. 4, No. 5, Oct./Nov. 1979, pp. 21–24.

*Primary Examiner*—Abraham Hershkovitz
*Attorney, Agent, or Firm*—James B. Raden; Donald J. Breh

[57] ABSTRACT

A brake booster for automotive vehicles comprises a low-pressure casing which is sealingly subdivided into a low-pressure chamber and a working chamber by a movable wall. The low-pressure casing is shaped to provide waists in the area of aligned bolts to fasten one end wall of the casing to a master brake cylinder and the other end wall of the casing to the vehicle. The casing has a casing wall section in the area of the waists extending in the axial direction to transmit tractive forces. In addition, tie elements may be provided outside the casing to interconnect the aligned bolts.

2 Claims, 6 Drawing Figures

LOW-PRESSURE CASING FOR A BRAKE BOOSTER

BACKGROUND OF THE INVENTION

The present invention relates to a low-pressure casing for a brake booster for automotive vehicles comprising two sheet-metal casing shells which are sealingly interconnected at the casing periphery, an axially movable wall sealingly subdividing the low-pressure casing into a low-pressure chamber and a working chamber and fastening screws engaged at opposite end walls of the low-pressure casing to connect the low-pressure casing to a master brake cylinder and to the vehicle.

In low-pressure brake boosters for automotive vehicles, the master brake cylinder is fitted to the one end wall of the low-pressure casing, while the other end wall is fastened to the automotive vehicle, preferably to the splash-board. The brake forces which are transmitted onto the actuating piston of the master brake cylinder when braking will have to be re-transmitted as reaction forces from the master brake cylinder onto the point where the brake booster is fastened to the automotive vehicle. Taking into consideration that these comparatively high tractive forces take their course via the low-pressure casing, the low-pressure casing has so far been of a comparatively thick-walled construction, which acts adversely to a generally desired reduction of the brake booster's weight.

A substantial reduction in weight by use of a low-pressure casing construction with thin walls may be achieved by having the tractive forces transmitted via tie elements extending through the interior of the low-pressure casing, for instance, via tie bolts, as disclosed in German Pat. No. DE-OS 2,845,794 or via a central reinforcement tube which interconnects the two end walls of the low-pressure casing as disclosed in U.S. copending application of J. Belart and F. Wienecke, Ser. No. 061,113, filed July 26, 1979, assigned to the same assignee as the present application. This requires a sealing of the axially movable wall at the point where these tie elements extend therethrough. The sealing necessitates additional structural arrangements and represents a possible source of failure.

SUMMARY OF THE INVENTION

It is, therefore, an object of the present invention to provide a low-pressure casing of the type referred to hereinabove having a thin-walled and, for this reason, light-weight construction with a sufficient amount of rigidity to transmit the forces occurring, while obviating the need for a sealing of the force-transmitting elements, such as tie bolts or a central reinforcement tube, extending through the movable wall.

A feature of the present invention is the provision of a low-pressure casing for a brake booster comprising: two sheet-metal casing shells coaxial of a longitudinal axis sealingly interconnected at the casing periphery to form the casing, the casing having end walls spaced from each other; an axially movable wall sealingly subdividing the casing into a low-pressure chamber and a working chamber; and bolts engaging each of the end walls to connect one of the end walls to a master brake cylinder and the other of the end walls to a vehicle; the casing having at least two waists to form a casing wall section extending substantially parallel to the axis to transmit tractive forces.

The casing wall section extending in the direction of the axis is loaded solely by tension by the forces acting on the low-pressure casing. This tension load is able to be received even in the event of a thin-walled construction, without appreciable deformations or expansions of the casing wall being caused thereby. In the remaining portions of the low-pressure casing, which are not used for the transmission of the forces, the casing will be constructed with a considerably greater radius to obtain the large effective surface which is necessary for the generation of the boosting forces.

Consequently, the circumferential shape of the casing differs from the circular shape which has been conventional practice so far. There are no tie elements provided in the interior of the casing which would have to be led through the movable wall and sealed thereto.

In a preferred embodiment of the present invention, two waists opposite to each other are provided. Thereby, a symmetrical introduction of force is ensured on the one hand. On the other hand, a complicated and, therefore, heavier casing construction is avoided which would result in a greater number of waists.

It has proven particularly advantageous to arrange the fastening bolts in the two end walls in the area of a waist and to bring them in alignment with one another. This results in the casing wall sections, which are provided for the transmission of tractive forces and which extend in the direction of the axis, being located in the area of the waists as an extension of the two aligned fastening screws, so that the tractive force is transmitted from the point of introduction at the fastening screw for the master brake cylinder via the casing wall section to the other fastening screw at the vehicle to a large extent in a straight line. The ring flange in the casing end wall which is usually connected with the fastening screws is not subjected to bending loads in this arrangement.

According to a favorable embodiment of the present invention, the casing wall sections arranged in the area between the casing's waists are placed essentially on a common cylindrical surface whose axis is the longitudinal axis of the low-pressure casing. In this construction, the basic shape of the circumferential casing wall is a cylinder having a waist at two opposite points. Compared to the shape without waists, the loss in effective surface is a comparatively small one, and it can be compensated for by merely a slight increase in the diameter of the low-pressure casing.

According to another embodiment of the present invention, casing portions arranged on both sides of the waists each include circumferential casing sections which lie on a cylindrical surface and whose axes are located at a distance from one another and parallel to the longitudinal axis of the casing. The basic shape of this casing construction represents two cylindrical sections merging into each other, so that the casing is approximately kidney-shaped in cross-section. The casing shape could also be referred to as a contracted ellipse. In this structure, the radii resulting at the periphery are comparatively large so that it is still possible without particular difficulty to arrange for a rolling diaphragm as a seal between the movable wall and the low-pressure casing.

In an improvement of the present invention, a particularly thin-walled and, therefore, particularly light-weight construction of the low-pressure casing may be attained by arranging for tie elements to be placed outside the waists of the casing which will connect the fastening screws of the two end walls assigned to one another. By these means, even the casing wall sections lying in the area of the waists and extending in the direction of the axis will be relieved from tension loads to a large degree, yet at the same time, the outwardly disposed tie elements are predominantly stressed by tension only since they extend basically in the direction of the axis. For this reason, these tie elements are permitted to be of small cross-sectional dimensions and, thus, of a light-weight design.

For example, the tie elements can be flat tongues abutting at the outside of the casing outside which are angled relative to the fastening screws. These tie elements have a particularly light weight and in addition provide ease of manufacture.

Instead of this arrangement, the tie elements can be tie rods which connect and are in alignment with the two aligned fastening bolts and which can, for instance, be even formed integrally with the fastening bolts. This arrangement accomplishes a transmission of tractive forces which is particularly favorable, i.e., free from all bending loads, and which affords a construction which is particularly economical with regard to material. Nevertheless, there are no seals required in the area of the tie rods because these are located outside the low-pressure casing. In the very thin-walled casing construction achieved by the measures according to the present invention, a connection of the two casing shells, which provides particular ease of manufacture, is attained by means of a curl-up or folded engagement extending around the casing periphery.

In the area of this curl-up or folded engagement, a bead of a rolling diaphragm may be sealingly received between the two casing shells which rolling diaphragm seals the movable wall relative to the low-pressure casing. This fastening and sealing of the rolling diaphragm relative to the low-pressure casing may be readily manufactured and assembled even in the event the shape of the junction between the two casing shells caused by the present invention differs from the circular shape.

BRIEF DESCRIPTION OF THE DRAWINGS

Above-mentioned and other features and objects of this invention will become more apparent by reference to the following description taken in conjunction with the accompanying drawings, in which.

DESCRIPTION OF THE PREFERRED EMBODIMENTS

Figure 2:
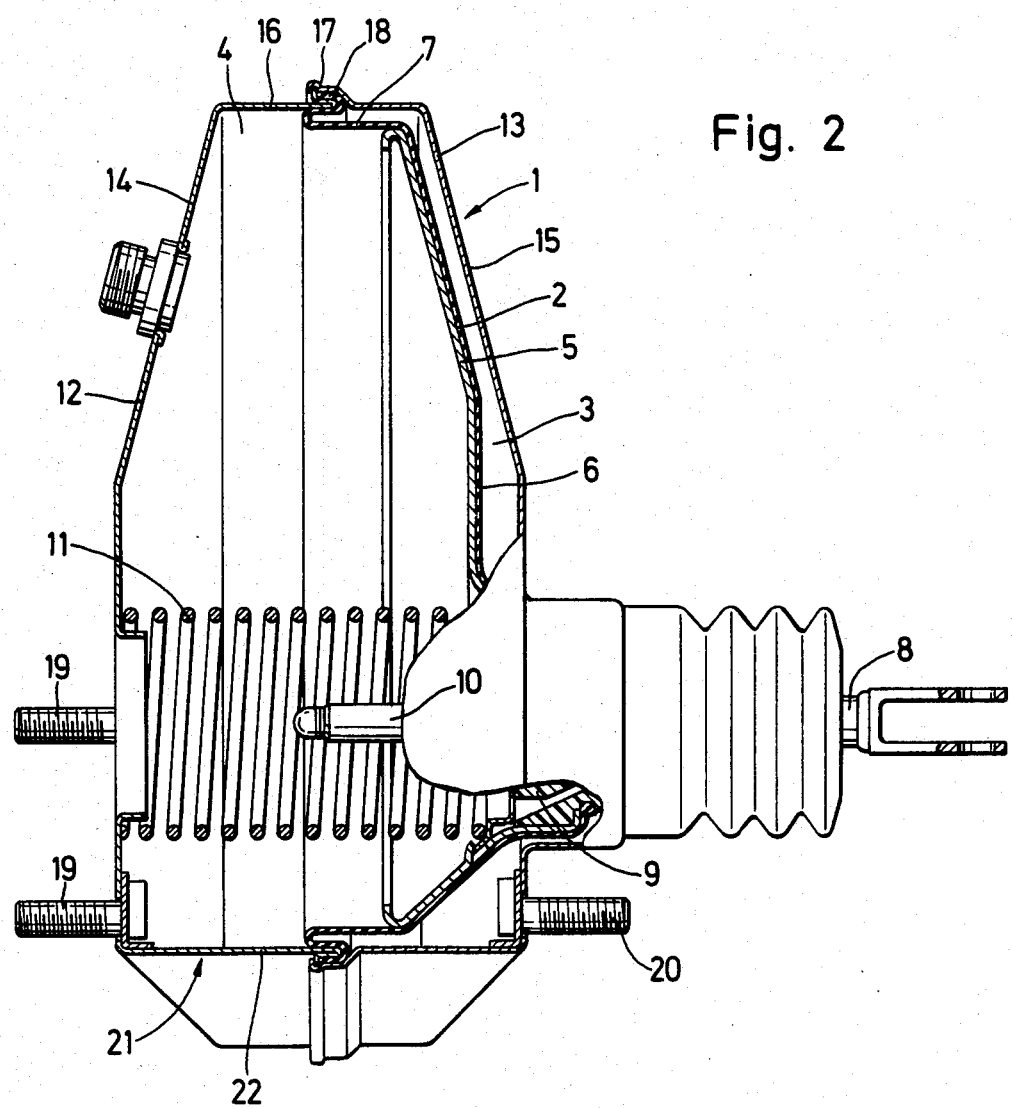
FIG. 2 is a cross sectional view taken along the line II—II in FIG. 1.

In all of the embodiments shown and as best seen in FIG. 2, the brake booster includes a low-pressure casing 1 made of a comparatively thin sheet metal, which is subdivided into a working chamber 3 and a low-pressure chamber 4 by an axially movable wall 2. Axially movable wall 2 is composed of a sheet-metal deep drawn diaphragm plate 5 and a flexible diaphragm 6 abutting thereon and forming a rolling diaphragm 7 as a seal between the outer periphery of diaphragm plate 5 and low-pressure casing 1.

A control valve 9 actuatable by a piston rod 8, which valve is not illustrated in more detail in the Figs., will open valve openings in the illustrated non-actuated position in such a manner that working chamber 3 is connected to low-pressure chamber 4. When control valve 9 is actuated by axial displacement of piston rod 8 by a brake pedal, the connection between low-pressure chamber 4 and working chamber 3 will be interrupted and working chamber 3 will be connected to atmosphere so that movable wall 2 moves in the direction of low-pressure chamber 4.

The braking force will be transmitted onto an actuating piston of a non-illustrated master brake cylinder via a push rod 10 connected to the housing of control valve 9. A compression spring 11 maintains movable wall 2 in the initial position shown.

The low-pressure casing 1 comprises two casing shells 12 and 13 each having an end wall 14 and 15, respectively, and a common circumferential casing section 16 placed between end walls 14 and 15. Approximately in the middle of circumferential casing section 16, the two casing shells 12 and 13 are interconnected by a curl-up or folded engagement 17. The folded engagement 17 receives also an outward bead 18 of rolling diaphragm 7 in a sealed relationship.

End wall 14 close to low-pressure chamber 4 is via fastening bolts 19 connected to a flange of a non-illustrated master brake cylinder. End wall 15 close to a working chamber 3 is via fastening bolts 20 connected to a non-illustrated splashboard of the automotive vehicle. Each of the two fastening bolts 19 is in alignment with a different one of the two fastening bolts 20.

At two opposite points, low-pressure casing 1 has a waist 21 in the area of fastening bolts 19 and 20 aligned with one another. The casing wall section 22 of circumferential casing wall 16 disposed in the area of each waist 21 extends parallel to the longitudinal axis of casing 1 and connects the two fastening bolts 19 and 20 in an essentially straight line.

Figure 1:
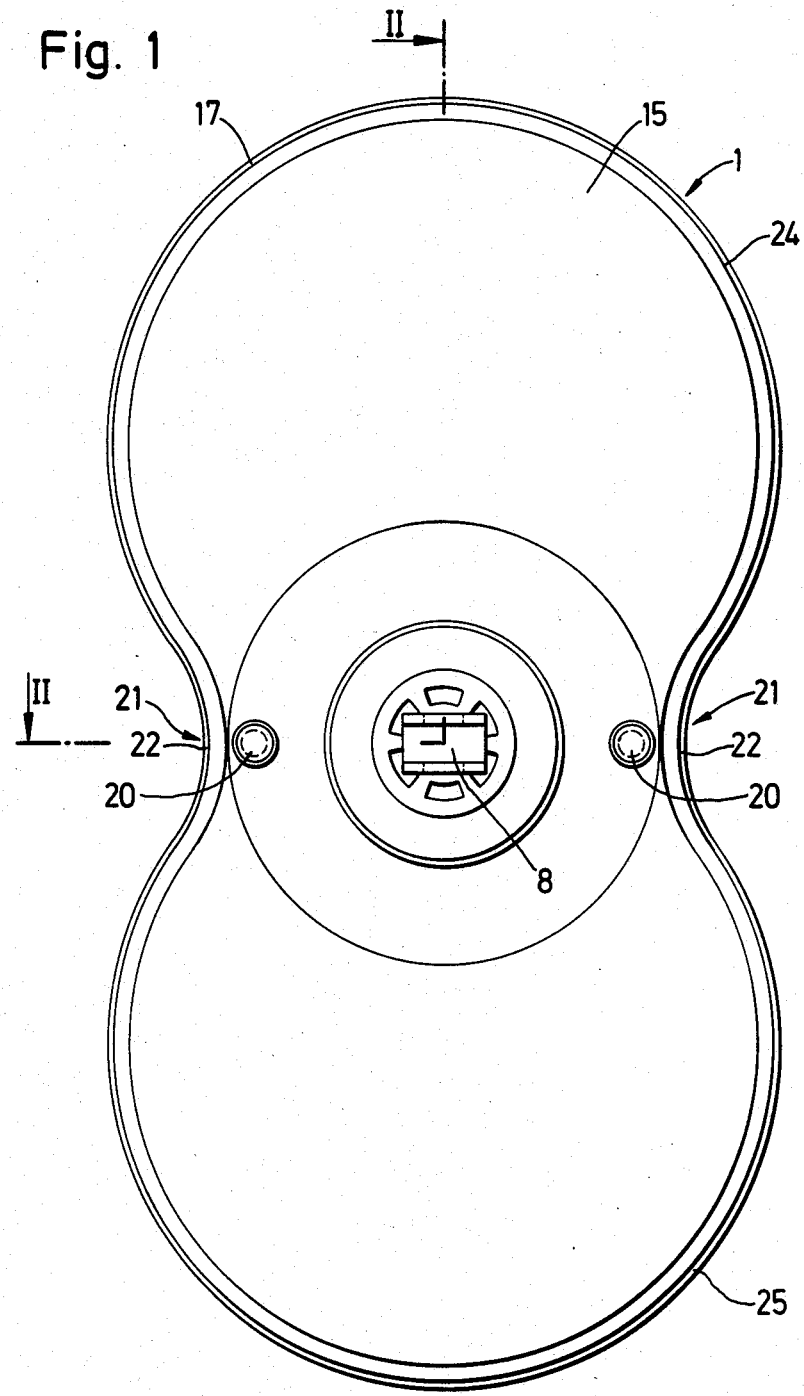
FIG. 1 is an end view of a brake booster viewed from the pedal side thereof in accordance with the principles of the present invention.
Figure 3:
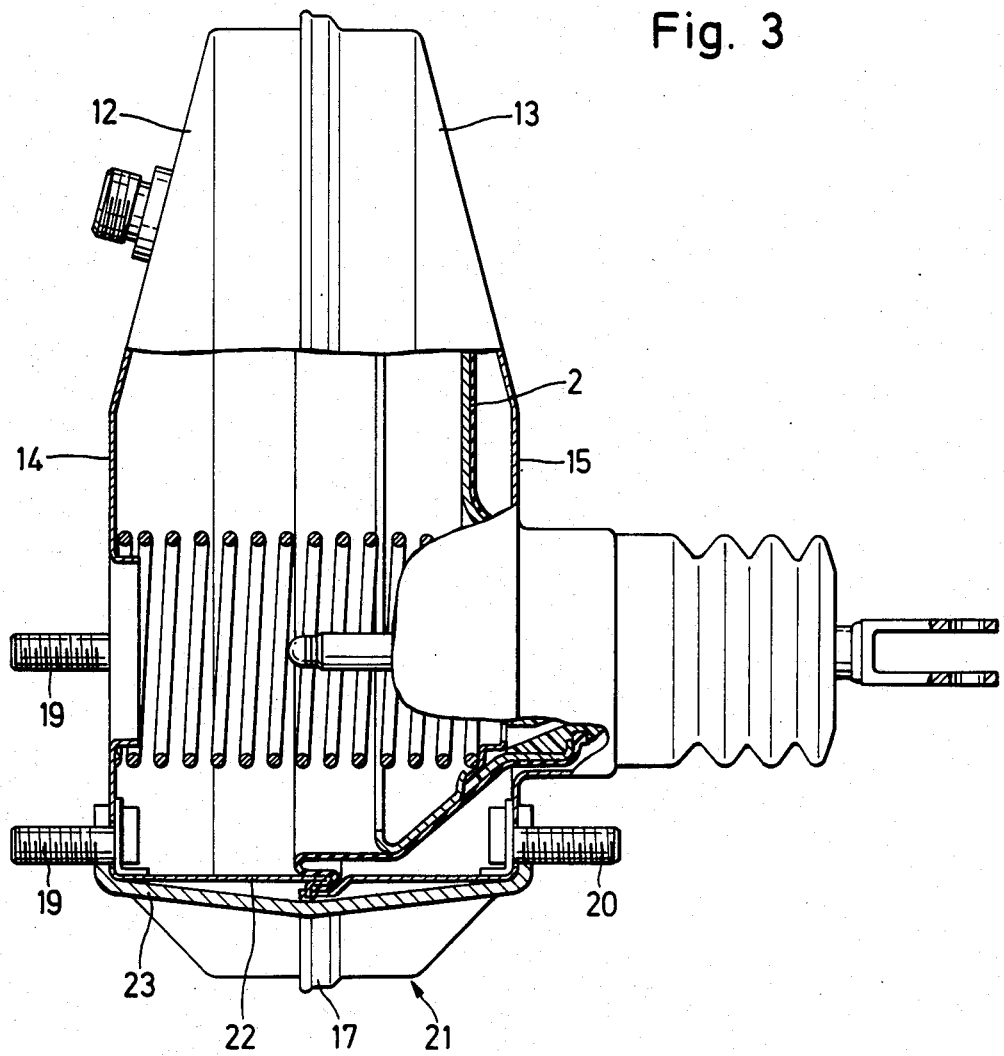
FIG. 3 is a partial longitudinal cross sectional view of a second embodiment of a brake booster in accordance with the principles of the present invention.

In an embodiment according to FIG. 3 modified with respect to FIGS. 1 and 2, there is provided a tie element 23 which connects the two aligned fastening bolts 19 and 20 and which is formed by a flat tongue, the tongue being angled at both its ends towards the planes of end walls 14 and 15 and connected to fastening bolts 19 and 20. Tie element 23 is located directly outside casing wall section 22 and transmits the tractive forces between fastening bolts 19 and 20.

In the event of the casing shape shown in FIG. 1, low-pressure casing 1 comprises two partly cylindrical casing portions 24 and 25 joining each other in the area of waists 21, whose cylinder axes are situated at a distance from one another and parallel to the longitudinal axis of casing 1. It may be clearly seen from FIG. 1 that only comparatively large bend radii occur at the casing periphery in this embodiment.

Figure 4:
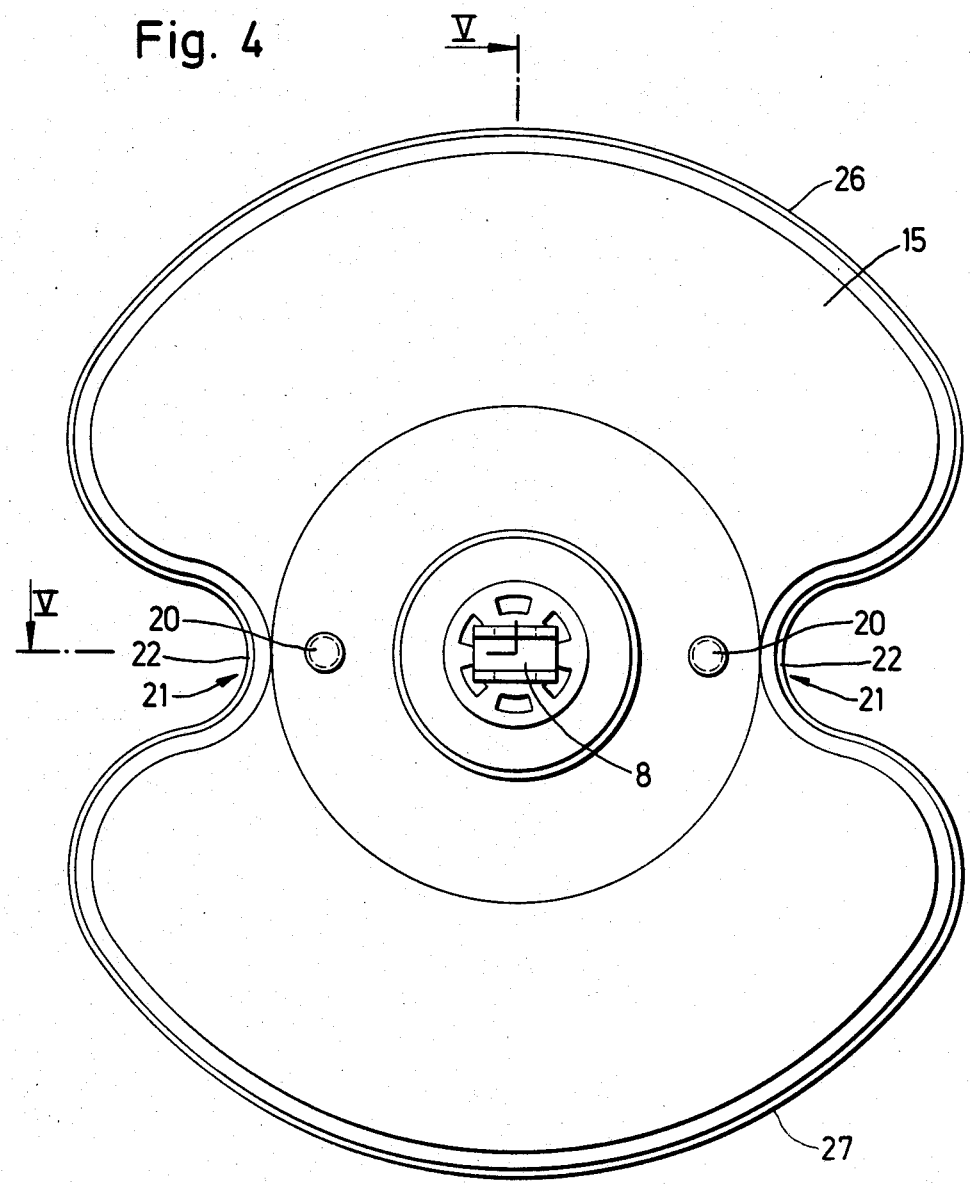
FIG. 4 is an end view of a third embodiment of the brake booster in accordance with the principles of the present invention as viewed from the pedal side.
Figure 5:
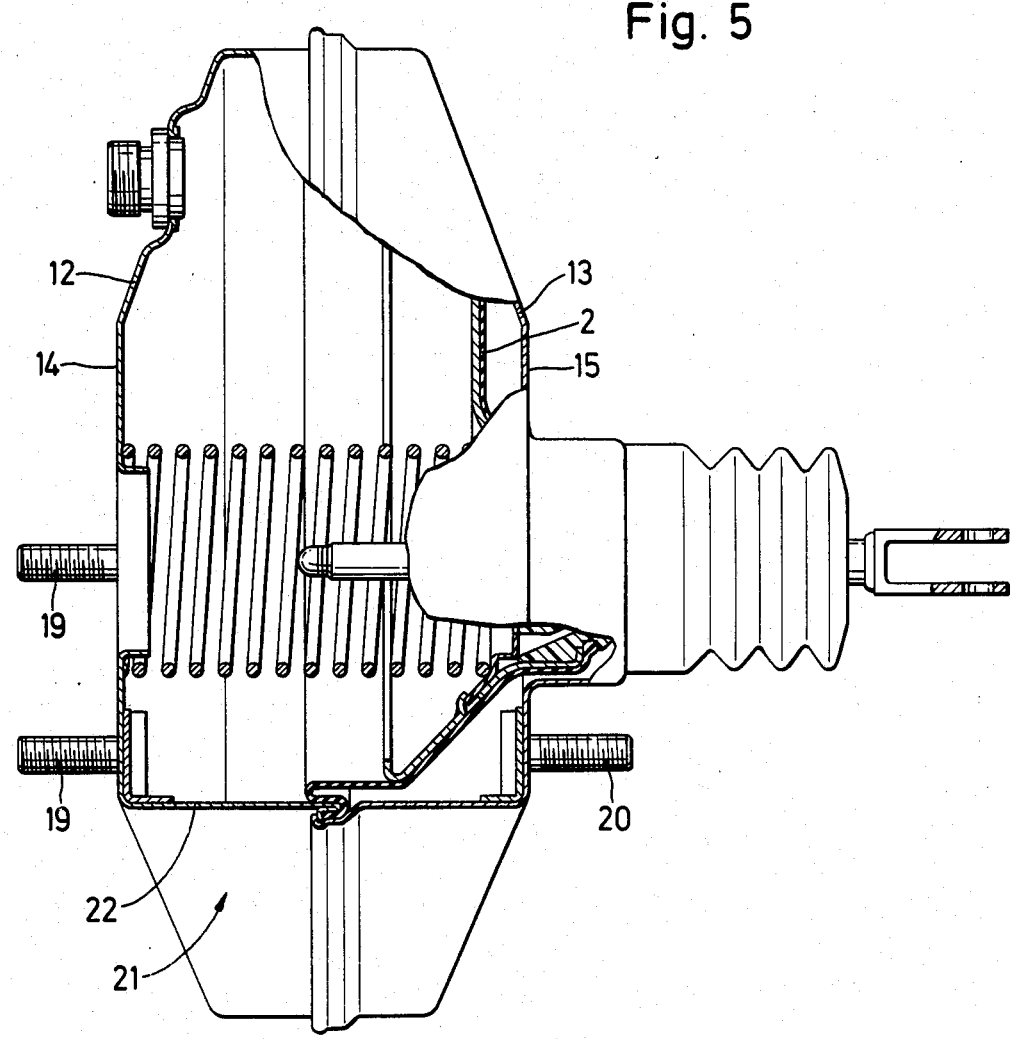
FIG. 5 is a cross sectional view taken along the line V—V in FIG. 4.

The casing shape shown in FIGS. 4 and 5 differs from that of FIGS. 1 and 2 in that arranged in the two areas between waists 21 are circumferential casing sections 26 and 27 of low-pressure casing 1 which are disposed on one common cylindrical surface whose axis is the longitudinal axis of low-pressure casing 1. Though somewhat smaller bend radii occur at the casing periphery in this case, the efficient use of the casing surface available as the effective boosting surface is more favorable in this arrangement.

The circumferential shape of movable wall 2 is in each case adapted to the inner shape of low-pressure casing 1, with a sufficient gap remaining at the edge for accommodation of rolling diaphragm 7.

Figure 6:
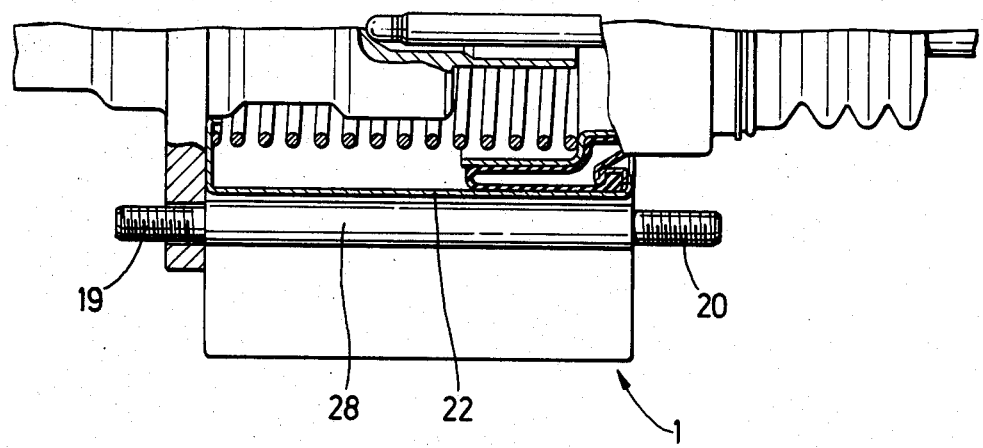
FIG. 6 is a partial longitudinal cross sectional view of a fourth embodiment of the brake booster in accordance with the principles of the present invention with a tie rod connecting the two fastening screws.

In the embodiment according to FIG. 6, fastening bolts 19 and 20 aligned with each other are formed integrally with a tie element constructed as a tie rod 28. In this structure, circumferential wall sections 22 disposed in the area of waists 21 will move in direct abutment with tie rods 28. The master brake cylinder is connected via fastening bolts 19, tie rods 28 and fastening bolts 20 directly to the splashboard of the automotive vehicle.

The Figures show that casing wall sections 22, in particular when serving to transmit tractive forces, are placed in the closest possible vicinity to the connecting line between fastening bolts 19 and 20 to the end that bending strain will be avoided in end walls 14 and 15 to a large extent.

While we have described above the principles of our invention in connection with specific apparatus, it is to be clearly understood that this description is made only by way of example and not as a limitation to the scope of our invention as set forth in the objects thereof and in the accompanying claims.

We claim:

1. A low-pressure casing for a brake booster comprising:
   two sheet metal casing shells coaxial of a longitudinal axis sealingly interconnected at the casing periphery to form said casing, said casing having a front and a rear end wall spaced from each other;
   an axially movable wall sealingly subdividing said casing into a low-pressure chamber and a working chamber;
   a first pair of mounting bolts affixed to said rear wall, extending therefrom and adapted to be mounted to an external mounting wall of a vehicle;
   a second pair of mounting bolts affixed to said front wall extending therefrom and adapted to be mounted to a flange on a master cylinder, each of said rear bolts lying on a common axis with a respective one of said front bolts, each said common axis lying parallel to the longitudinal axis of said casing;
   said casing having two waists defining two casing wall sections, each of said wall sections extending parallel to and substantially on a respective one of said common axes to transmit tractive forces; and
   said casing further having circumferential casing sections disposed on each of said front and rear end walls between said waists, each of said circumferential casing sections on said front and said rear wall being disposed on a common cylindrical surface having an axis coinciding with the longitudinal axis of said casing.

2. A low-pressure casing for a brake booster comprising:
   two sheet metal casing shells coaxial of a longitudinal axis sealingly interconnected at the casing periphery to form said casing, said casing having a front and a rear end wall spaced from each other,
   an axially movable wall sealingly subdividing said casing into a low-pressure chamber and a working chamber;
   a first pair of mounting bolts affixed to said rear wall, extending therefrom and adapted to be mounted to an external mounting wall of a vehicle;
   a second pair of mounting bolts affixed to said front wall extending therefrom and adapted to be mounted to a flange on a master cylinder, each of said rear bolts lying on a common axis with a respective one of said front bolts, each said common axis lying parallel to the longitudinal axis of said casing;
   said casing having two waists defining two casing wall sections, each of said wall sections extending parallel to and substantially on a respective one of said common axes to transmit tractive forces; and
   said casing further having circumferential casing sections disposed on each of said front and rear end walls between said waists, each of said circumferential casing sections lying on a different cylindrical surface, each of said cylindrical surfaces having an axis spaced from each other and from said longitudinal axis of said casing.

* * * * *